United States Patent
Chen et al.

(10) Patent No.: US 8,184,457 B2
(45) Date of Patent: May 22, 2012

(54) SWITCH MODE POWER SUPPLY FOR IN-LINE VOLTAGE APPLICATIONS

(75) Inventors: Yimin Chen, Palatine, IL (US); Yuhong Fang, Naperville, IL (US); Romel Panlilio, St. Charles, IL (US); Arun Ganesh, Montgomery, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 654 days.

(21) Appl. No.: 12/375,229

(22) PCT Filed: Jul. 26, 2007

(86) PCT No.: PCT/IB2007/052974
§ 371 (c)(1),
(2), (4) Date: Jan. 27, 2009

(87) PCT Pub. No.: WO2008/012772
PCT Pub. Date: Jan. 31, 2008

(65) Prior Publication Data
US 2010/0067273 A1  Mar. 18, 2010

Related U.S. Application Data

(60) Provisional application No. 60/820,505, filed on Jul. 27, 2006.

(51) Int. Cl.
G05F 1/00 (2006.01)
H02H 7/10 (2006.01)
(52) U.S. Cl. .......... 363/53; 323/222; 323/224; 361/111
(58) Field of Classification Search .......... 363/52, 363/53, 76, 77, 78, 79, 125; 361/111; 323/222, 323/223, 224
See application file for complete search history.

(56) References Cited

U.S. PATENT DOCUMENTS

| | | | | |
|---|---|---|---|---|
| 4,958,121 A | * | 9/1990 | Cuomo et al. | 323/224 |
| 5,095,261 A | * | 3/1992 | Schoofs | 323/222 |
| 6,043,636 A | * | 3/2000 | Gaudreau et al. | 323/282 |
| 6,362,982 B1 | * | 3/2002 | Despatie et al. | 363/56.09 |
| 6,473,284 B1 | * | 10/2002 | Ilic et al. | 361/91.1 |
| 6,806,810 B2 | * | 10/2004 | Robinson | 340/457.1 |
| 6,807,071 B1 | * | 10/2004 | Zhang et al. | 363/20 |
| 2003/0178892 A1 | | 9/2003 | Black et al. | |
| 2004/0052023 A1 | | 3/2004 | Asplund | |
| 2005/0041356 A1 | * | 2/2005 | Storm et al. | 361/118 |
| 2006/0062031 A1 | | 3/2006 | Kim et al. | |

FOREIGN PATENT DOCUMENTS

EP   0371923 A1   6/1990

(Continued)

*Primary Examiner* — Gary L Laxton
*Assistant Examiner* — Zekre Tsehaye

(57) ABSTRACT

A switch mode power supply (15) employs a rectifier (20), a converter (50) and converter driver (60). The rectifier (20) generates a rectified supply voltage ($V_{RS}$) based on an in-line voltage ($V_{LN}$), and the converter driver (60) generates one or more driving voltages ($V_{DR}$) to facilitate a conversion by the converter (50) of the rectified supply voltage ($V_{RS}$) to a DC bus voltage ($V_{DC}$) based on the driving voltage(s) ($V_{DR}$). The converter (50) may include a transient voltage suppression device (52) to suppress the rectified supply voltage ($V_{RS}$) in response to an abnormal line condition of the switch mode power supply (15), and the converter driver (60) may include a free-oscillating suppression device (61) to suppress the one or more driving voltages ($V_{DR}$) in response to a free-oscillating condition of the converter driver (60).

16 Claims, 7 Drawing Sheets

FOREIGN PATENT DOCUMENTS

| | | | |
|---|---|---|---|
| EP | 0375020 | A2 | 6/1990 |
| EP | 0375020 | A3 | 6/1990 |
| EP | 0375020 | B1 | 10/1995 |
| EP | 1508950 | A2 | 2/2005 |

* cited by examiner

SWITCH MODE POWER SUPPLY FOR IN-LINE VOLTAGE APPLICATIONS

The present invention generally relates to switch mode power supplies of any type for in-line voltage applications. The present invention specifically relates to a transient voltage protection and a MOSFET driving protection of a switch mode power supply utilized for in-line voltage applications, particularly a switch mode power supply employing a two-switch buck-boost converter.

FIG. 1 illustrates a switch mode power supply 10 as known in the art. Switch mode power supply 10 employs a rectifier 20 having a transient voltage suppression device 21 (e.g., one or more varistors), a converter 30 having an electronic switch device 31 (e.g., a buck topology, a boost topology or a buck-boost topology), and a converter driver 40. In a normal line condition of power supply 10, rectifier 20 generates an unregulated rectified supply voltage $V_{RS}$ in response to an in-line voltage $V_{LN}$ being applied thereto, and in turn, electronic switching device 31 is controlled via one or more drive voltages $V_{DR}$ from converter driver 40 to convert rectified supply voltage $V_{RS}$ into a regulated DC bus voltage $V_{DC}$. In an abnormal line condition of power supply 10, a transient voltage $V_{TR}$ is additionally applied to rectifier 20 whereby transient voltage suppression device 21 will conduct to suppress rectified supply voltage $V_{RS}$ to thereby prevent transient voltage $V_{TR}$ from causing damage to electronic switching device 31.

For example, FIG. 2 illustrates a switch mode power supply 11 as a two-switch buck boost version of switch mode power supply 10. A rectifier 12 of switch mode power supply 11 includes a standard topology as shown of a fuse F1, a varistor V1, an inductor L1, an inductor L2, a capacitor C1, a varistor V2, a rectifying diode bridge D1-D4, and a rectifier output capacitor C2 (e.g., a 235 nF) for generating rectified supply voltage $V_{RS}$ across rectifier output capacitor C2 in response to in-line voltage $V_{LN}$ being applied between an input line INT and a neutral line NEU of switch mode power supply 11.

A two-switch buck boost converter 13 of switch mode power supply 11 includes a standard topology as shown of a MOSFET switch Q1, a diode D6, an inductor L3, a MOSFET switch Q2, a diode D5, a resistor R5 (e.g., 0.45Ω) and a converter output capacitor C3 (e.g., 47 µF) for converting rectified supply voltage $V_{RS}$ into a regulated DC bus voltage $V_{DC}$ across converter output capacitor C3. A power factor correction ("PFC") driver 14 of switch mode power supply 11 includes a standard topology as shown of a PFC controller U1 (e.g., L6561), a resistor R1 (e.g., 1Ω), a blocking capacitor C4 (e.g., 22 µF), and a transformer T having a primary transformer winding T1-A, a secondary transformer winding T1-B and a secondary transformer winding T1-C. A driving circuit for MOSFET switch Q1 includes secondary winding T1-B as well as a capacitor C5 (e.g., 100 µF), a diode D7 and a resistor R3 (e.g., 2.2 kΩ). A driving circuit for MOSFET switch Q2 includes secondary winding T1-C as well as a capacitor C6 (e.g., 100 µF), a diode D8 and a resistor R4 (e.g., 2.2 kΩ).

Varistors V1 and V2 prevent an application of a transient voltage $V_{TR}$ (FIG. 1) on rectifier 12 from causing damage to MOSFET switch Q1. Specifically, MOSFETS Q1 and Q2 are simultaneously switched between a conductive state and a nonconductive state by PFC driver 14 via respective drive voltages $V_{DR1}$ and $V_{DR2}$ in view of attaining a unity power factor. When MOSFETS Q1 and Q2 are initially switched to a conductive state upon the initial application of line voltage $V_{LIN}$ between input line INT and neutral line NEU, rectified supply voltage $V_{RS}$ generated across capacitor C2 is initially applied across inductor L3. When MOSFETS Q1 and Q2 are then switched to a nonconductive state, current of inductor L3 will flow through diodes D5 and D6 to charge the converter output capacitor C3 to generate DC bus voltage $V_{DC}$ across converter output capacitor C3. Thereafter, MOSFETS Q1 and Q2 are switched between the conductive state and the nonconductive state by PFC driver 14 via respective drive voltages $V_{DR1}$ and $V_{DR2}$ in a manner that regulates DC bus voltage $V_{DC}$ across converter output capacitor C3 in view of attaining a unity power factor.

For switch mode power supply 11, varistors V1 and V2 are used to suppress rectified supply voltage $V_{RS}$ by clamping rectified supply voltage $V_{RS}$ as generated across rectifier output capacitor C2. For example, with an input line voltage $V_{LN}$ of 480 $V_{ac}$, varistors V1 and V2 of 560 $V_{ac}$ are used to clamp rectified supply voltage $V_{RS}$ as generated across capacitor C2. A drawback to varistors V1 and V2 is the clamp voltage of varistors V1 and V2 changes when current flowing through varistors V1 and V2 changes. Thus, for example, with 560 $V_{ac}$ varistors V1 and V2 will have a clamp voltage of 1,400 $V_{dc}$ at a current of 50 amps flowing through varistors V1 and V2 in response to an application of transient voltage $V_{TR}$ (FIG. 1) to rectifier 12. So ideally, MOSFET switch Q1 must have a withstanding voltage higher than 1,400 $V_{dc}$. However, for economic and manufacturing reasons, MOSFET switch Q1 will typically have a withstanding voltage of 1,000 $V_{dc}$. In this case, voltage across MOSFET switch Q1 will be higher than its withstanding voltage upon an application of transient voltage $V_{TR}$ to rectifier 12 whereby MOSFET switch Q1 and Q2 is susceptible to being damaged in view of transient voltage $V_{TR}$ being applied to rectifier 20.

Referring again to FIG. 1, in a controlled oscillating condition of converter driver 40, each drive voltage $V_{DR}$ is controlled in terms of a magnitude and a duty cycle thereof to facilitate a desired conversion of rectified supply voltage $V_{RS}$ to DC bus voltage $V_{DC}$. Conversely, in a free-oscillating condition of converter driver 40, each drive voltage $V_{DR}$ is uncontrollable in terms of a magnitude and a duty cycle thereof whereby MOSFETS Q1 and Q2 are susceptible to being damaged in view of any voltage being applied to rectifier 20.

For example, in PFC driver 14 shown in FIG. 2, if PFC controller U1 interrupted or inoperative for any reason (e.g., a turn ON/OFF transition or a file test), the output of PFC controller U1 is shorted to ground. As a result, blocking capacitor C4 and primary transformer winding T1-A start free-oscillating with a frequency $f=1/(2 \cdot \pi \cdot (L_{T1-A} \cdot C_{C4})^{1/2})$ where $L_{T1-A}$ is an inductance of primary transformer winding T1-A and $C_{C4}$ is a capacitance of blocking capacitor C4. At the beginning of the free-oscillation, voltage across blocking capacitor C4 is applied to primary transformer winding T1-A as a negative voltage. On the secondary side of the transformer, this negative voltage turns on diodes D7 and D8 whereby capacitors C5 and C6 are charged. As this free-oscillating continues, voltage at the primary side of the transformer increases from negative to zero whereby voltage across capacitors C5 and C6 becomes higher than the voltage of respective secondary transformer windings T1-B and T1-C. The result is diodes D7 and D8 are turned off whereby capacitors C5 and C6 discharge through respective resistors R3 and R4. Because the discharge rate of capacitors C5 and C6 is slower than a rate of a voltage increase at respective secondary transformer windings T1-B and T1-C, then the voltage difference between capacitors C5 and C6 and respective secondary transformer windings T1-B and T1-C secondary windings creates a positive voltage at gate terminals of MOSFETS Q1 and Q2. As a result, damage may occur to MOSFETS Q1 and Q2 if any voltage is present between input terminal IN and neutral terminal NEU.

Furthermore, transformer windings T1-A, T1-B and T1-C may get saturated as the free oscillation of the transformer continues. If so, a rate of voltage increase at the primary side from negative to zero will increase to thereby further maintain the positive voltage at gate terminals of MOSFETS Q1 and Q2. Again, damage may occur to MOSFETS Q1 and Q2 if any voltage is present between input terminal IN and neutral terminal NEU.

The present invention provides a new and unique transient voltage protection and MOSFET driving protection for a switch mode power supply to overcome the drawbacks with switch mode power supply 10 (FIG. 1), particularly when embodied as switch mode power supply 11 (FIG. 2).

In one form of the present invention, a switch mode power supply comprises a rectifier operable to generate a rectified supply voltage based on an in-line voltage, and a converter in electrical communication with the rectifier to convert the rectified supply voltage to a DC bus voltage. The converter includes a transient voltage suppression device operable to suppress the rectified supply voltage in response to an abnormal line condition of the switch mode power supply.

In a second form of the present invention, a switch mode power supply comprises a rectifier operable to generate a rectified supply voltage based on an in-line voltage, a converter driver operate to generate one or more drive voltages, and a converter in electrical communication with the rectifier and the converter driver to convert the rectified supply voltage to a DC bus voltage based on the drive voltage(s). The converter driver includes a free-oscillating suppression device operable to suppress the drive voltage(s) in response to a free-oscillating condition of the converter driver.

The foregoing forms and other forms of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

Figure 3:
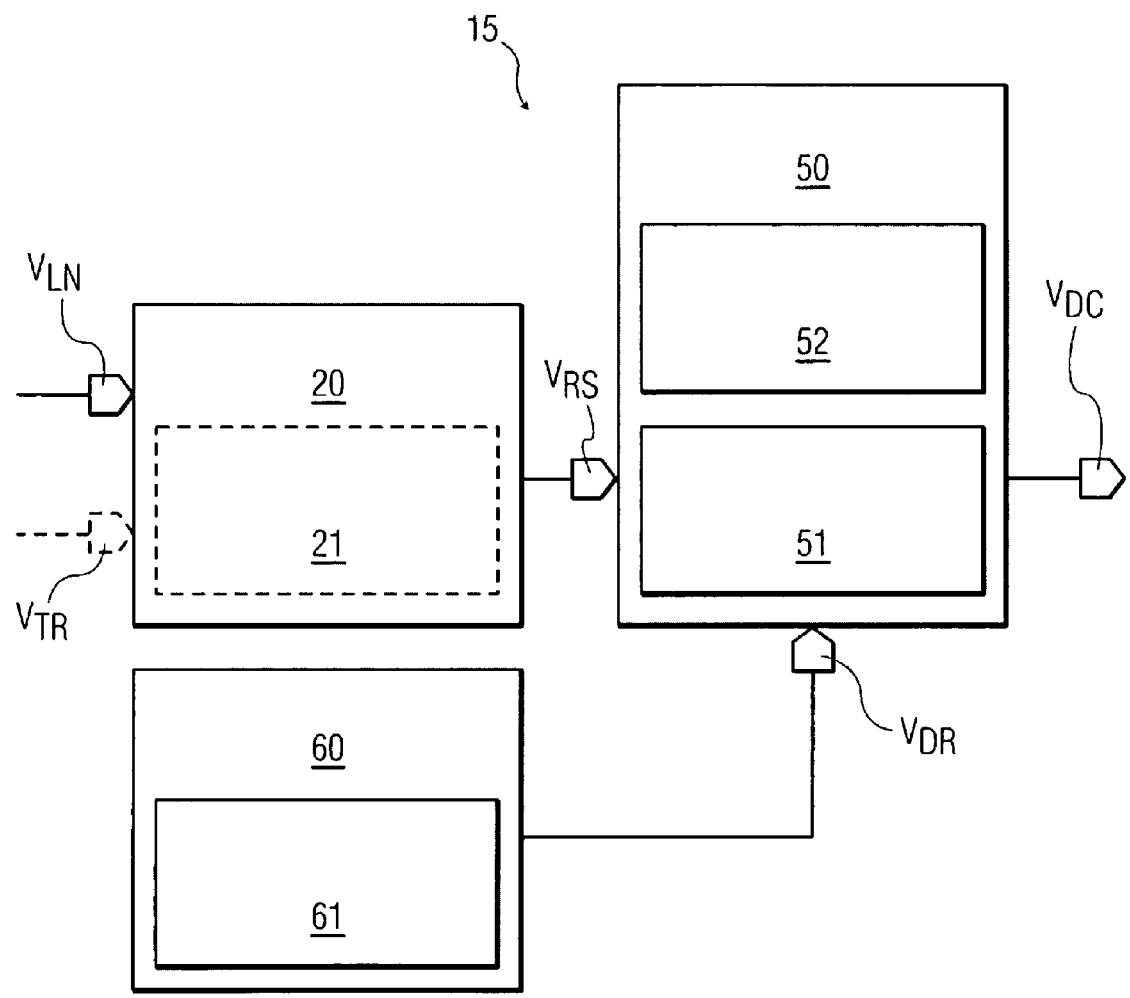
FIG. 3 illustrates a block diagram of one embodiment of a switch mode power supply in accordance with the present invention.

Referring to FIG. 3, a switch mode power supply 15 of the present invention employs rectifier 20 optionally having transient voltage suppression device 21, a converter 50 having an electronic switch device 51 (e.g., a buck topology, a boost topology or a buck-boost topology) and a transient voltage suppression device (e.g., one or more varistors), and a converter driver 60 having a free-oscillation suppression device 61. In a normal line condition of power supply 15, rectifier 20 generates an unregulated rectified supply voltage $V_{RS}$ in response to an in-line voltage $V_{LN}$ being applied thereto, and in turn, electronic switching device 51 is controlled via one or more drive voltages $V_{DR}$ from converter driver 60 to convert rectified supply voltage $V_{RS}$ into a regulated DC bus voltage $V_{DC}$. In an abnormal line condition of power supply 10, a transient voltage $V_{TR}$ is additionally applied to rectifier 20 whereby transient voltage suppression device 52 will primarily conduct to suppress rectified supply voltage $V_{RS}$ to thereby prevent transient voltage $V_{TR}$ from causing damage to electronic switching device 51. In a free-oscillating condition of converter driver 60, free-oscillation suppression device 61 to suppress the drive voltages from converter driver 60 to electronic switching device 51.

In practice, the present invention does not impose any limits or any restrictions as to the structural configuration of switched mode power supply 15. Thus, the following description of various component embodiments of switched mode power supply 15 as shown in FIGS. 4-7 does not limit nor restrict the structural configuration scope of switched mode power supply 15 in view of the inventive principles of the present invention.

Figure 1:
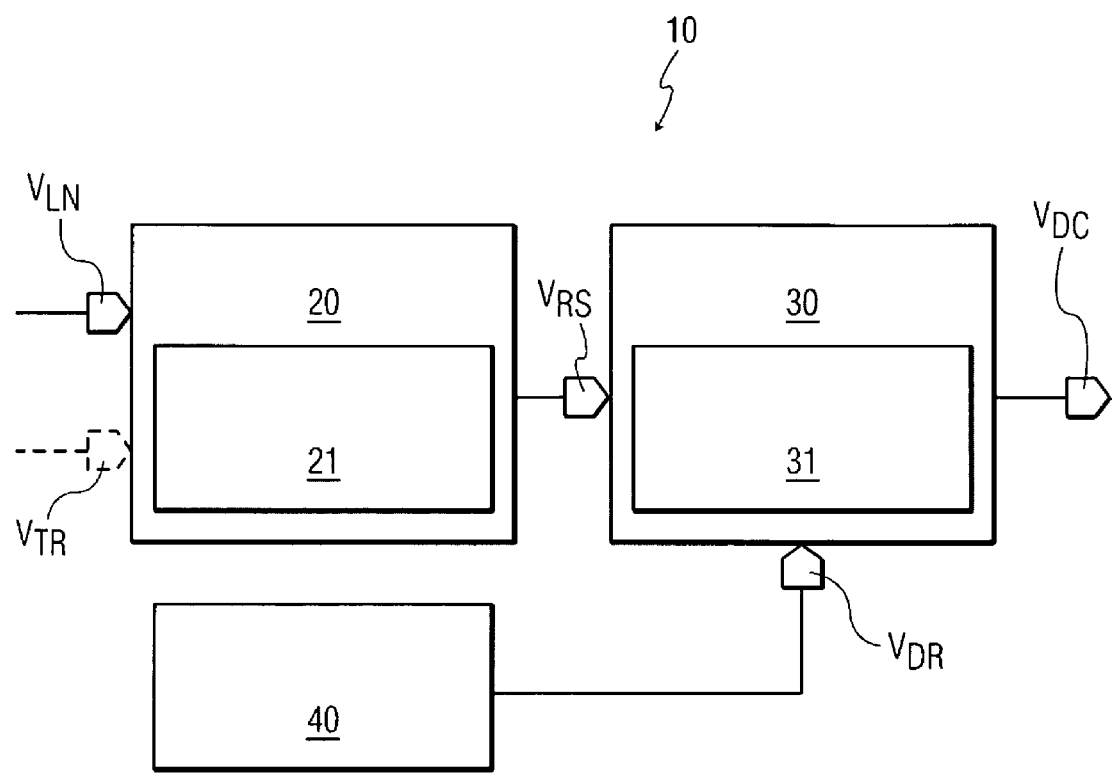
FIG. 1 illustrates a block diagram of one embodiment of a switch mode power supply as known in the art.
Figure 2:
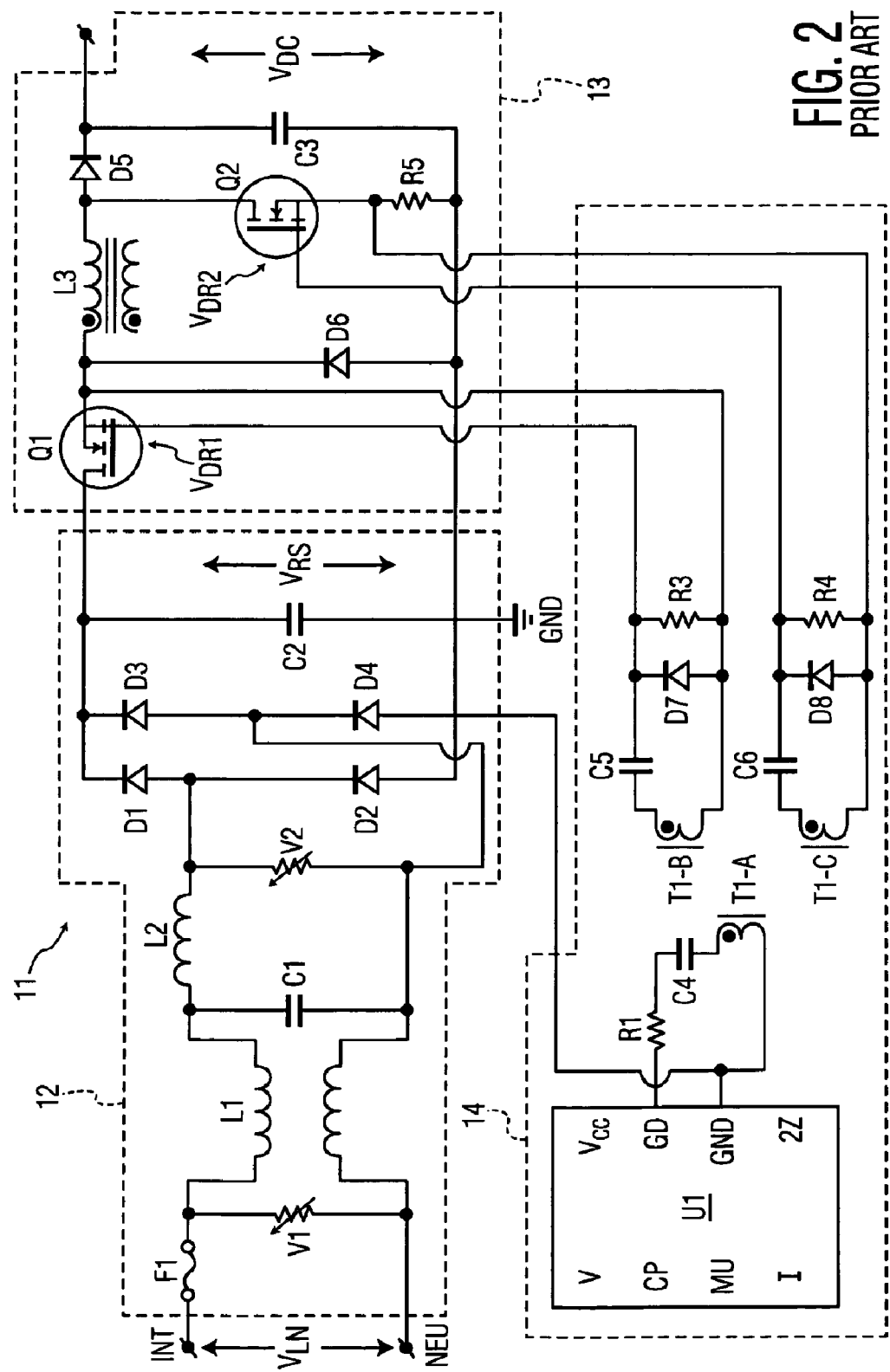
FIG. 2 illustrates a schematic diagram of one embodiment of the switch mode power supply illustrated in FIG. 1 as known in the art.
Figure 4:
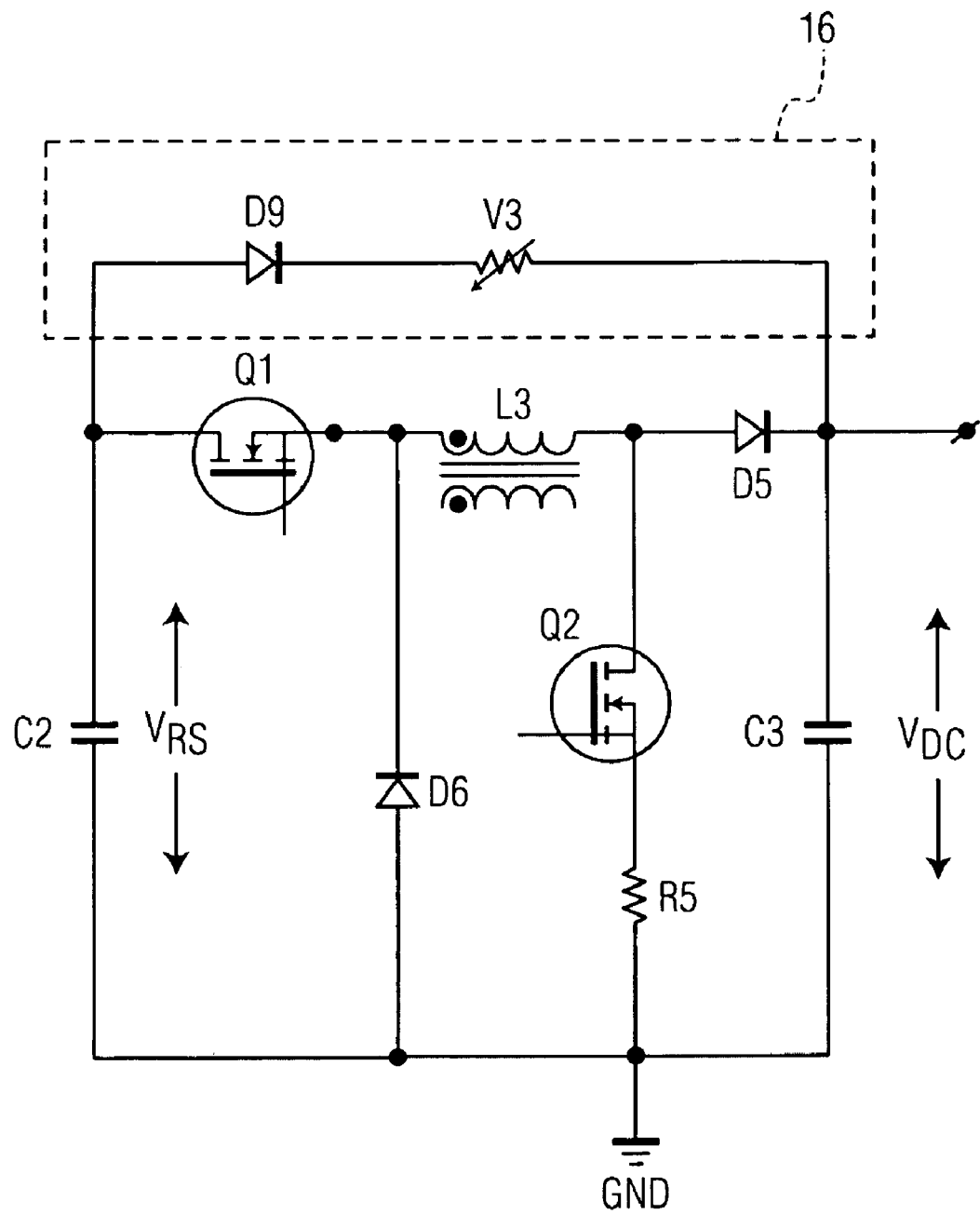
FIG. 4 illustrates a schematic diagram of a first embodiment of a transient voltage suppression device in accordance with the present invention.

Referring to FIG. 4, a transient voltage suppression device 16 of the present invention employs a series connection of a diode D9 and a varistor V3 electrically connected to rectifier output capacitor C2 and converter output capacitor C3. In this embodiment, varistor V2 may be omitted from rectifier 12 as shown in FIG. 2.

Varistor V3 conditionally clamps rectified supply voltage $V_{RS}$ across rectifier output capacitor C2 to be lower than a withstanding voltage $V_{Q1WS}$ of MOSFET switch Q1 in accordance with the following inventive transient voltage protection principles [1] and [2]:

$$V_{DC} + V_{CLAMP} < V_{Q1WS} \quad [1]$$

$$V_{DC} + V_{UNCLAMP} > V_{RSPK} \quad [2]$$

where $V_{CLAMP}$ is a clamping voltage of varistor V3 at rated current, $V_{UNCLAMP}$ is a stand off voltage of varistor V3, and $V_{RSPK}$ is a peak voltage of rectified supply voltage $V_{RS}$ under normal line condition of rectifier 12 (FIG. 2).

In operation, diode D9 is used to drive varistor V3 in a conductive state under an abnormal line condition of power supply 15 and to drive varistor V3 in a nonconductive state under a normal line condition power supply 15. Inventive transient voltage protection principle [1] ensures rectified supply voltage $V_{RS}$ across rectifier output capacitor C2 will be clamped by a conductive varistor V3 below withstanding voltage $V_{Q1WS}$ of MOSFET switch Q1 under an abnormal line condition of power supply 15. Inventive transient voltage protection principle [2] ensures varistor V3 is in a nonconductive state under a normal line condition of power supply 15.

Figure 5:
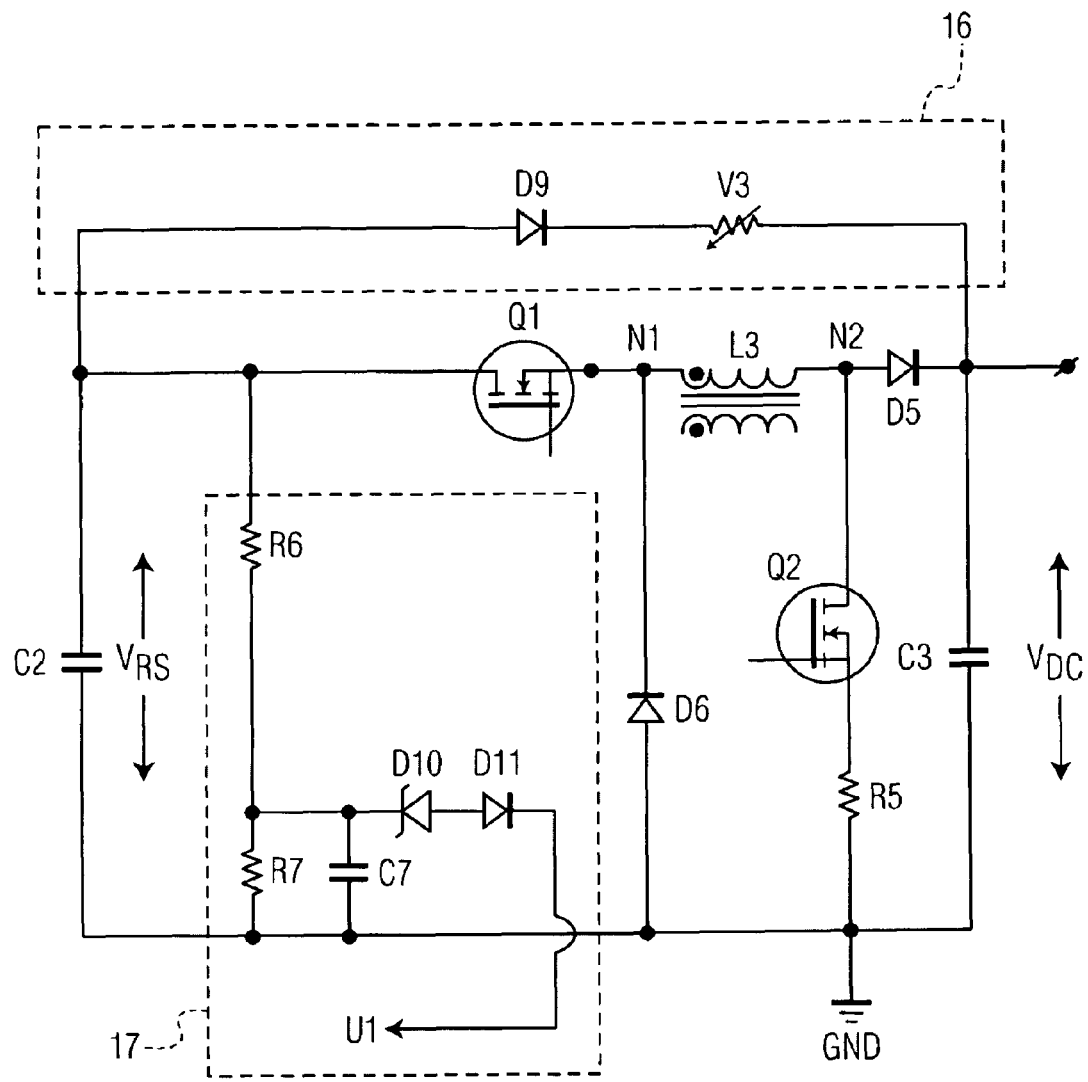
FIG. 5 illustrates a schematic diagram of a second embodiment of a transient voltage suppression device in accordance with the present invention.

Referring to FIG. 5, a transient voltage sensing device 17 is provided to supplement the transient voltage protection of MOSFET switch Q1 provided by transient voltage suppression device 16. Transient voltage sensing device 17 includes a series connection of a resistor R6 (e.g., 1.1 MΩ) and a resistor R7 (e.g., 2.2 kΩ) electrically connected in parallel to rectifier output capacitor C2. A capacitor C7 (e.g., 30 pF) is electrically connected in parallel to resistor R7. A series connection of a zener diode D10 and a diode D11 are electrically connected a midpoint of the series connection of resistors R6 and R7 and a sensor input of PFC controller U1 (FIG. 2).

In this embodiment, varistor V3 conditionally clamps rectified supply voltage $V_{RS}$ across rectifier output capacitor C2 to be lower than withstanding voltage $V_{Q1WS}$ of MOSFET switch Q1 in accordance with the following inventive transient voltage protection principles [2] and [3]:

$$V_{DC} + V_{UNCLAMP} > V_{RSPK} \quad [2]$$

$$V_{CLAMP} < V_{Q1WS} \quad [3]$$

In operation, diode D9 is again used to drive varistor V3 in a conductive state under an abnormal line condition of power supply 15 and to drive varistor V3 in a nonconductive state under a normal line condition of power supply 15. Inventive transient voltage protection principle [3] ensures voltage across MOSFET switch Q1 will not exceed withstanding voltage $V_{Q1WS}$ of MOSFET switch Q1 under an abnormal line condition of power supply 15. Inventive transient voltage protection principle [2] again ensures varistor V3 is in a nonconductive state under a normal line condition of power supply 15.

More specifically, under a normal line condition of power supply 15, rectified supply voltage $V_{RS}$ is lower than withstanding voltage $V_{Q1WS}$. Conversely, under an abnormal line condition, like a lighting surge, rectified supply voltage $V_{RS}$ will increase. When rectified supply voltage $V_{RS}$ close to withstanding voltage $V_{Q1WS}$, voltage across capacitor C7 will be higher than a withstanding voltage $V_{D10WS}$ of zener diode D10 whereby zener diode D10 will conduct and a current will flow through diodes D10 and D11 to PFC controller U1. As a result, PFC controller U1 will drive MOSFETS Q1 and Q2 to a nonconductive state whereby voltage across inductor L3 between a node N1 and N2 will be floating.

When rectified supply voltage $V_{RS}$ voltage rises higher than withstanding voltage $V_{Q1WS}$, the MOSFET switch Q1 will normally start to avalanche. But in this situation, the avalanche energy of MOSFET switch Q1 is very small due to the load is a parasitic capacitance of diode D6 and MOSFET switch Q1, which are very small. The voltage at nodes N1 and N2 will raise. However, before the voltage between nodes N1 and N2 exceeds DC bus voltage $V_{DC}$, varistor V3 will be driven to a conductive state in view of principle [3]. Thus, MOSFET switch Q1 will never avalanche through diode D5 to converter output capacitor C3, which will be relative quite big. Furthermore, rectified supply voltage $V_{RS}$ will be clamped to $V_{DC} + V_{CLAMP}$ whereby energy of rectifier output capacitor C2 will be transferred to converter output capacitor C3 through diode D9 and varistor V3. Once this energy transfer drops rectified supply voltage $V_{RS}$ below withstanding voltage $V_{Q1WS}$, then current flow through diodes D10 and D11 will cease whereby PFC controller 11 will restart drive voltage $V_{DR1}$ and $V_{DR2}$.

Figure 6:
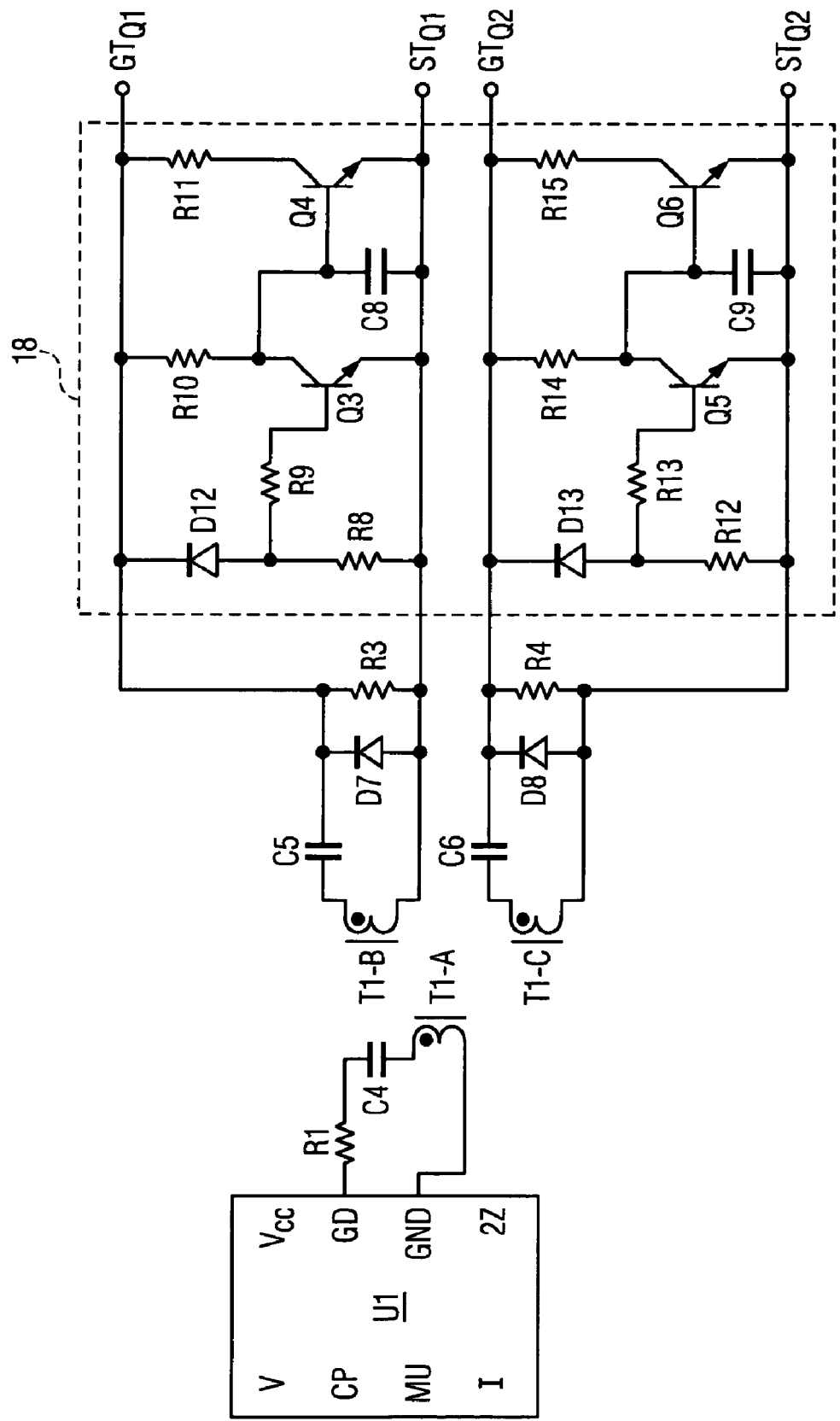
FIG. 6 illustrates a schematic diagram of a first embodiment of a free-oscillation suppression device in accordance with the present invention.

Referring to FIG. 6, a free-oscillation suppression device 18 of the present invention employs a series connection of a zener diode D12 and a resistor R8 (e.g., 10Ω) electrically connected in parallel to diode D7 and resistor R3 (e.g., 10 kΩ), a resistor R9 (e.g., 10 kΩ) electrically connecting a midpoint of the series connection of diode D12 and resistor R8 to a base terminal of a NPN transistor Q3, a series connection of a resistor R10 (e.g., 2 KΩ) and NPN transistor Q3 electrically connected in parallel to diode D7 and resistor R3, and a series connection of a resistor R11 (e.g., 68Ω) and a NPN transistor Q4 electrically connected in parallel to diode D7 and resistor R3 with a base terminal of NPN transistor Q4 being electrically connected to a midpoint of the series connection of resistor R10 and NPN transistor Q3. An optional capacitor C8 (e.g., 470 pF) electrical connects the base terminal of NPN transistor Q4 to the emitter terminal of NPN transistor Q4.

Free-oscillation suppression device 18 further employs a series connection of a diode D13 and a resistor R12 (e.g., 10 kΩ) electrically connected in parallel to diode D8 and resistor R4 (e.g., 10 kΩ), a resistor R13 (e.g., 10 kΩ) electrically connecting a midpoint of the series connection of diode D13 and resistor R12 to a base terminal of a NPN transistor Q5, a series connection of a resistor R14 (e.g., 2Ω) and NPN transistor Q5 electrically connected in parallel to diode D8 and resistor R4, and a series connection of a resistor R15 (e.g., 68Ω) and a NPN transistor Q6 electrically connected in parallel to diode D8 and resistor R4 with a base terminal of NPN transistor Q6 being electrically connected to a midpoint of the series connection of resistor R14 and NPN transistor Q5. An optional capacitor C9 (e.g., 470 pF) electrical connects the base terminal of NPN transistor Q6 to the emitter terminal of NPN transistor Q6.

In operation, drive voltages $V_{DR1}$ and $V_{DR2}$ are higher than a Zener voltage of respective diodes D12 and D13 during a normal high driving state whereby NPN transistors Q3 and Q5 are driven to a conductive state and in turn, NPN transistors Q4 and Q6 are drive to a nonconductive state. In this high driving state, resistive value of resistors R10 and R14 should be selected to be sufficiently bigger than the resistive value of resistors R3 and R4 whereby device 18 will not adversely affect driving voltages $V_{DR1}$ and $V_{DR2}$.

During a normal low driving state of drive voltages $V_{DR1}$ and $V_{DR2}$, drive voltages $V_{DR1}$ and $V_{DR2}$ at respective gate terminals $GT_{Q1}$ and $GT_{Q2}$ of MOSFETS Q1 and Q2 are close to zero whereby NPN transistors Q3 and Q5 driven to a nonconductive state; NPN transistor Q4 is driven to a conductive state whereby NPN transistor Q4 and resistors R10 and R11 are added to gate terminal $GT_{Q1}$ of MOSFET switch Q1 as a load; and NPN transistor Q6 is drive to a conductive state whereby NPN transistor Q6 and resistors R14 and R15 are added to gate terminal $GT_{Q2}$ of MOSFET switch Q2 as a load. This extra load is to help in quickly driving MOSFETS Q1 and Q2 to a nonconductive state. During this normal low driving state, a negative voltage equal to a voltage across blocking capacitor C4 is applied to primary transformer winding T1-A whereby negative voltages across secondary transformer windings T1-B and T1-C are equal to the voltages across respective capacitors C5 and C6 to thereby prevent a discharge of capacitors C5 and C6.

IF PFC controller U1 is interrupted or inoperative for any reason (e.g., a turn ON/OFF transition or a file test), then free oscillating of the primary side of the transformer or a saturation of the transformer will cause a voltage increase at both the primary and secondary sides of the transformer from negative to zero. However, the extra load introduced by R11 and R15 (e.g., 100 Ohm or lower) will quickly discharge capacitors C5 and C6 to eliminate the positive voltage at the respective gate terminals $GT_{Q1}$ and $GT_{Q2}$ of MOSFET switch Q1 and Q2 to thereby prevent MOSFETS Q1 and Q2 from being driven to a conductive state.

Figure 7:
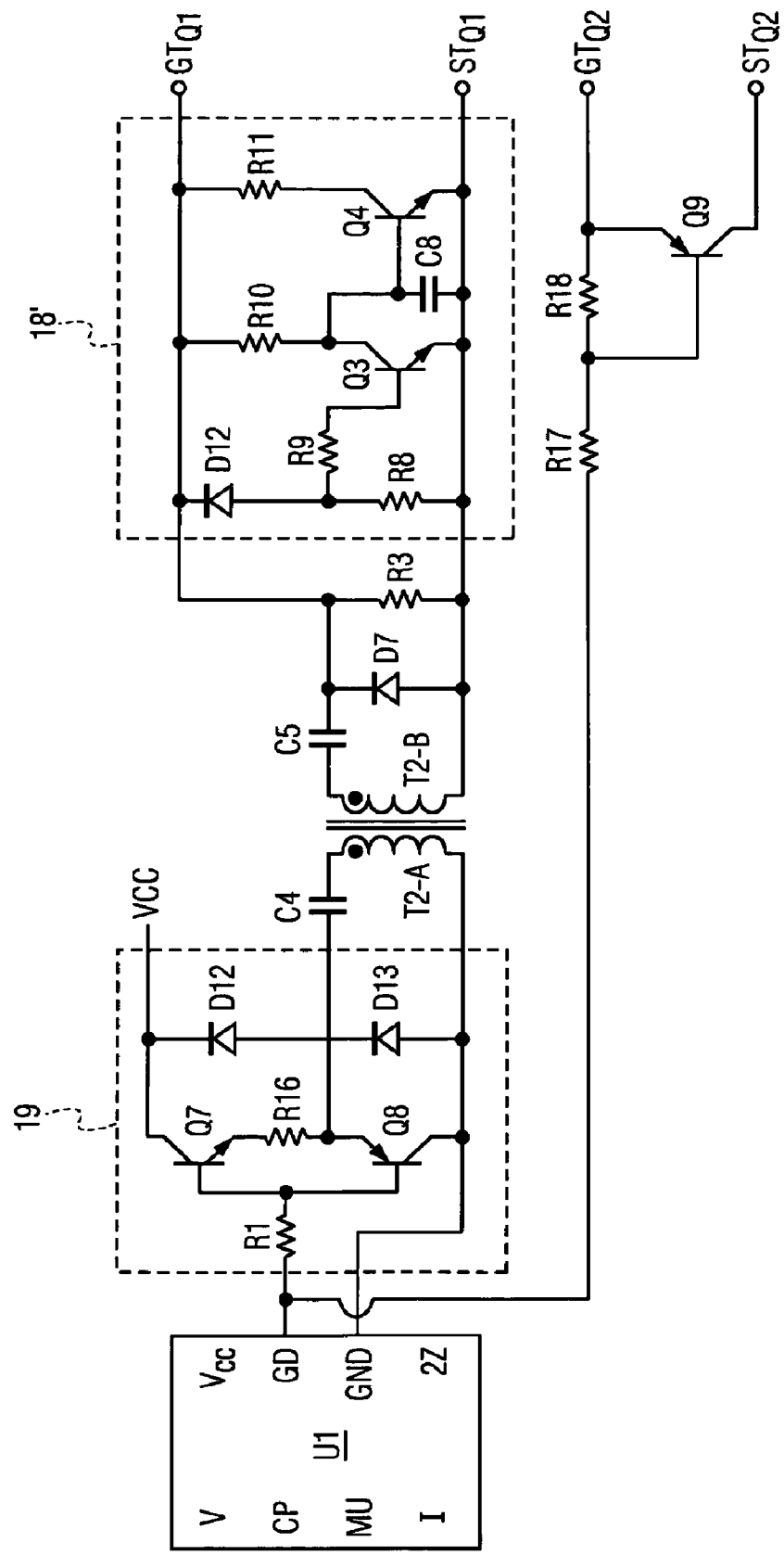
FIG. 7 illustrates a schematic diagram of a second embodiment of a free-oscillation suppression device in accordance with the present invention.

Referring to FIG. 7, a free-oscillation suppression device 18' of the present invention employs diode D12, resistors R8-R11, NPN transistors Q3 and Q4, and optional capacitor C8 of device 17 (FIG. 6). For device 18', a buffer 19 and a transformer T2 having a primary transformer winding T2-A and a secondary transformer winding T2-B is used in lieu of transformer T1 (FIG. 6). Specifically, buffer 19 employs a resistor R1 (e.g., 22Ω) electrically connected to a base terminal of NPN transistor Q7 and a base terminal of PNP transistor Q8. A collector terminal of NPN transistor Q7 is electrically connected to a voltage supply VCC, and a collector terminal of PNP transistor Q8 is electrically connected to ground pin GND of PFC controller U1.

A resistor R16 (e.g., 10Ω) is electrically connected an emitter terminal of NPN transistor Q7 and an emitter terminal of PNP transistor Q8. A series connection of a diode D12 and diode D13 is electrically connected to voltage supply VCC and ground pin GND of PFC controller U1. Capacitor C4 is electrically connected to resistor R16, the emitter terminal of PNP transistor Q8 and a midpoint of the series connection of diodes D12 and D13. Primary transformer winding T2-A is electrically connected to capacitor C4 and ground pin GND of PFC controller U1. Secondary winding T2-B is electrically connected to capacitor C5 and source terminal $ST_{Q1}$ of MOSFET switch Q1.

For MOSFET switch Q2, a series connection of a resistor R17 (e.g., 100Ω) and a resistor R18 (e.g., 47Ω) is electrically connected to a GD pin of PFC controller U1 and gate terminal $GT_{Q2}$ of MOSFET switch Q2. A base terminal of a PNP transistor Q9 is electrically connected to a midpoint of the series connection of resistors R7 and R8. A collector terminal of PNP transistor Q9 is electrically connected to source terminal $ST_{Q2}$ of MOSFET switch Q2.

In operation, PFC controller U1 and device 18' perform similar to PFC controller U1 and device 18 (FIG. 6) as related to driving MOSFET switch Q1 with the exception of the protection buffer 19 provides PFC controller U1 from any corrupted signal from MOSFET switch Q1 to device 18'. MOSFET switch Q2 on the other hand is directly driven by PFC controller U1, but with the same protection from any corrupted feedback from MOSFET switch Q1 to device 18'.

Referring to FIGS. 3-7, those having ordinary skill in the art will appreciate numerous advantages of the present invention including, but not limited to, an improved transient voltage protection and MOSEFT driving protection of a switch mode power supply. Additionally, those having ordinary skill in the art will further appreciate how to apply the inventive principles of the present invention to other forms of switch mode power supplies in accordance with the present invention based on the exemplary buck-boost converter shown in FIGS. 4 and 5.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

The invention claimed is:

1. A switch mode power supply (15), comprising:
a rectifier (20) operable to generate a rectified supply voltage ($V_{RS}$) based on an in-line voltage ($V_{LN}$);
a converter (50) in electrical communication with the rectifier (20) to convert the rectified supply voltage ($V_{RS}$) to a DC bus voltage ($V_{DC}$), wherein the converter (50) includes a transient voltage suppression device (52) operable to suppress the rectified supply voltage ($V_{RS}$) in response to an abnormal line condition of the switch mode power supply (15);
wherein the converter (50) further includes an electronic switching device (51); and
a transient voltage sensing device (16) operable to facilitate the electronic switching device (51) being driven to a nonconductive state in response to the abnormal line condition of the switch mode power supply (15);
wherein the rectifier (20) includes a rectifier output capacitor (C2) and the rectified supply voltage ($V_{RS}$) is generated across the rectifier output capacitor (C2);
wherein the converter (50) further includes a converter output capacitor (C3) and the DC bus voltage ($V_{DC}$) is generated across the converter output capacitor (C3); and
wherein the transient voltage suppression device (52) includes a varistor (V3) operable to facilitate an exchange energy from the rectifier output capacitor (C2) to the converter output capacitor (C3) based on the electronic switching device (51) being driven to the nonconductive state in response to the abnormal line condition of the switch mode power supply (15).

2. The switch mode power supply (15) of claim 1, wherein the transient voltage suppression device (52) includes a varistor (V3) operable to clamp the rectified supply voltage ($V_{RS}$) in response to the abnormal line condition of the switch mode power supply (15).

3. The switch mode power supply (15) of claim 2, wherein the transient voltage suppression device (52) further includes a diode (D9) operable to drive the varistor (V3) to a conductive state in response to the abnormal line condition of the switch mode power supply (15).

4. The switch mode power supply (15) of claim 3, wherein the diode (D9) is operable to drive the varistor (V3) to a nonconductive state in response to a normal line condition of the switch mode power supply (15).

5. The switch mode power supply (15) of claim 2,
wherein the rectifier (20) includes a rectifier output capacitor (C2) and the rectified supply voltage ($V_{RS}$) is generated across the rectifier output capacitor (C2);
wherein the converter (50) further includes a converter output capacitor (C3) and the DC bus voltage ($V_{DC}$) is generated across the converter output capacitor (C3); and
wherein the varistor (V3) is in electrical communication with the rectifier output capacitor (C2) and the converter output capacitor (C3) to thereby clamp the rectified supply voltage ($V_{RS}$) in response to the abnormal line condition of the switch mode power supply (15).

6. A switch mode power supply (15), comprising:
a rectifier (20) operable to generate a rectified supply voltage ($V_{RS}$) based on an in-line voltage ($V_{LN}$);
a converter driver (60) operable to generate at least one driving voltage ($V_{DR}$);
a converter (50) in electrical communication with the rectifier (20) and the converter driver (60) to convert the rectified supply voltage ($V_{RS}$) to a DC bus voltage ($V_{DC}$) based on the at least one driving voltage ($V_{DR}$); and
wherein the converter driver (60) includes a free-oscillating suppression device (61) operable to suppress the at least one driving voltage ($V_{DR}$) in response to a free-oscillating condition of the converter driver (60);
wherein the rectifier (20) includes a rectifier output capacitor (C2) and the rectified supply voltage ($V_{RS}$) is generated across the rectifier output capacitor (C2);
wherein the converter (50) further includes a converter output capacitor (C3) and the DC bus voltage ($V_{DC}$) is generated across the converter output capacitor (C3); and
wherein the varistor (V3) is in electrical communication with the rectifier output capacitor (C2) and the converter output capacitor (C3) to thereby clamp the rectified supply ($V_{RS}$) in response to the abnormal line condition of the switch mode power supply (15).

7. The switch mode power supply (15) of claim 6,
wherein the converter driver (60) further includes:
- a primary transformer winding (T1-A);
- a secondary transformer winding (T1-B) in electrical communication with the primary transformer winding (T1-A);
- a capacitor (C5) in electrical communication with the secondary transformer winding (T1-B) and the converter (50);
- a power factor correction controller (U1) in electrical communication with the primary transformer winding (T1-A) to control an application of a first driving voltage ($V_{DR1}$) to the converter (50); and
- wherein the free-oscillation suppression device (61) is in electrical communication with the capacitor (C5) and the converter (50) to discharge the capacitor (C5) in response to a free-oscillation of the primary transformer winding (T1-A).

8. The switch mode power supply (15) of claim 7, wherein a discharge rate of the capacitor (C5) exceeds a voltage rising rate of the free-oscillation of the primary transformer winding (T1-A) to drive the converter (50) into a non-conductive state in response to the free-oscillation of the primary transformer winding (T1-A).

9. The switch mode power supply (15) of claim 7, wherein the converter driver (60) further includes:
- a primary transformer winding (T2-A);
- a secondary transformer winding (T2-B) in electrical communication with the primary transformer winding (T2-A);
- a capacitor (C5) in electrical communication with the secondary transformer winding (T2-B) and the converter (50);
- a power factor correction controller (U1) is in electrical communication with the primary transformer winding (T2-A) to control an application of a first driving voltage ($V_{DR1}$) to the converter (50); and
- wherein the free-oscillation suppression device (61) is in electrical communication with the capacitor (C5) and the converter (50) to discharge the capacitor (C5) in response to a free-oscillation of the primary transformer winding (T2-A), and
- wherein the electrical communication between the power factor correction controller (U1) and the primary transformer winding (T2-A) is buffered to prevent a feedback from the converter (50) to the power factor controller (U1).

10. A switch mode power supply (15), comprising:
- a rectifier (20) operable to generate a rectified supply voltage ($V_{RS}$) based on an in-line voltage ($V_{LN}$);
- a converter driver (60) operable to generate at least one driving voltage ($V_{DR}$);
- a converter (50) in electrical communication with the rectifier (20) and the converter driver (60) to convert the rectified supply voltage ($V_{RS}$) to a DC bus voltage ($V_{DC}$) based on the at least one driving voltage ($V_{DR}$);
- wherein the converter (50) includes a transient voltage suppression device (52) operable to suppress the rectified supply voltage ($V_{RS}$) in response to an abnormal line condition of the switch mode power supply (15);
- wherein the converter driver (60) includes a free-oscillation suppression device (61) operable to suppress the at least one driving voltage ($V_{DR}$) in response to a free-oscillating condition of the converter driver (60);
- wherein the transient voltage suppression device (52) includes a varistor (V3) operable to clamp the rectified supply voltage ($V_{RS}$) in response to the abnormal line condition of the switch mode power supply (15);
- wherein the rectifier (20) includes a rectifier output capacitor (C2) and the rectified supply voltage ($V_{RS}$) is generated across the rectifier output capacitor (C2);
- wherein the converter (50) further includes a converter output capacitor (C3) and the DC bus voltage ($V_{DC}$) is generated across the converter output capacitor (C3); and
- wherein the varistor (V3) is in electrical communication with the rectifier output capacitor (C2) and the converter output capacitor (C3) to thereby clamp the rectified supply voltage ($V_{RS}$) in response to the abnormal line condition of the switch mode power supply (15).

11. The switch mode power supply (15) of claim 10, wherein the transient voltage suppression device (52) further includes a diode (D9) operable to drive the varistor (V3) to a conductive state in response to the abnormal line condition of the switch mode power supply (15).

12. The switch mode power supply (15) of claim 11, wherein the diode (D9) is operable to drive the varistor (V3) to a nonconductive state in response to a normal line condition of the switch mode power supply (15).

13. The switch mode power supply (15) of claim 10, wherein the converter (50) further includes:
- an electronic switching device (51); and
- a transient voltage sensing device (16) operable to facilitate the electronic switching device (51) being driven to a nonconductive state in response to the abnormal line condition of the switch mode power supply (15).

14. The switch mode power supply (15) of claim 13,
- wherein the rectifier (20) includes a rectifier output capacitor (C2) and the rectified supply voltage ($V_{RS}$) is generated across the rectifier output capacitor (C2);
- wherein the converter (50) further includes a converter output capacitor (C3) and the DC bus voltage ($V_{DC}$) is generated across the converter output capacitor (C3); and
- wherein the transient voltage suppression device (52) includes a varistor (V3) operable to facilitate an exchange energy from the rectifier output capacitor (C2) to the converter output capacitor (C3) based on the electronic switching device (51) being driven to a nonconductive state in response to the abnormal line condition of the switch mode power supply (15).

15. The switch mode power supply (15) of claim 10,
wherein the converter driver (60) further includes:
- a primary transformer winding (T1-A);
- a secondary transformer winding (T1-B) in electrical communication with the primary transformer winding (T1-A);
- a capacitor (C5) in electrical communication with the secondary transformer winding (T1-B) and the converter (50);
- a power factor correction controller (U1) in electrical communication with the primary transformer winding (T1-A) to control an application a first driving voltage ($V_{DR1}$) to the converter (50); and
- wherein the free-oscillating suppression device (61) in electrical communication with the capacitor (C5) and the converter (50) to discharge the capacitor (C5) in response to a free-oscillation of the primary transformer winding (T1-A).

16. The switch mode power supply (15) of claim 15, wherein a discharge rate of the capacitor (C5) exceeds a voltage rising rate of the free-oscillation of the primary transformer winding (T1-A) to drive the converter (50) into a non-conductive state in response to the free-oscillation of the primary transformer winding (T1-A).

* * * * *